Patented Feb. 17, 1931

1,792,770

UNITED STATES PATENT OFFICE

LORIN B. SEBRELL, OF AKRON, OHIO, AND DEXTER N. SHAW, OF PHILADELPHIA, PENNSYLVANIA, ASSIGNORS TO THE GOODYEAR TIRE & RUBBER COMPANY, OF AKRON, OHIO, A CORPORATION OF OHIO

VULCANIZATION OF RUBBER AND METHOD OF PRODUCING SAME

No Drawing. Application filed November 18, 1924. Serial No. 750,660.

Our invention relates to the vulcanization of rubber and rubber-like substances and it has, for its object, the rapid vulcanization and production of a product having desirable qualities. More particularly, it relates to the use of amidoxims and their aldehyde derivatives as aids in the curing of caoutchouc.

The application of the invention to the use of aldehyde derivatives of amidoxims is covered in our divisional application, Serial No. 163,299, filed Jan. 24, 1927.

It may well be said that the present state of industrial progress owes much to the advances made in the rubber industry and this industry, in turn, is indebted in a large part to the progress made in the vulcanization of its raw materials. Search for new accelerators of vulcanization has been carried on with three main objectives; first, for accelerators which give products with a high tensile strength; second, for accelerators which give a vulcanized product which will age well; and third, for accelerators which need a shorter time to bring about the desired cure.

In line with the progress toward this trifold objective we have found that the amidoxims have properties which place them in a prominent position with the best known catalysts, and the same may be said of their aldehyde derivatives. In general, the amidoxims are prepared by the action of a hydroxylamine on a nitrile. This reaction is common and may be indicated in the following manner:

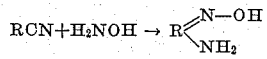

Example: Ortho-tolylamidoxim

Hydroxylamine hydrochloride and ortho-tolylnitrile are neutralized with soda ash and dissolved in as little water as possible; enough alcohol is then added to make the solution clear and the mixture is refluxed for several hours. The reaction is slow; however, at the end of twenty-four hours, if the alcohol is allowed to evaporate and the mixture diluted with water, the amidoxim separates out as white flakes. A yield of about 92% is thus obtained and on recrystallization in water a pure product separates out, which has a melting point within 2° of the chemically pure substance (145° C.). Its formation may be represented thusly:

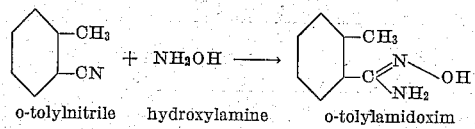

o-tolylnitrile  hydroxylamine  o-tolylamidoxim

In citing o-tolylamidoxim as an example of the preparation of amidoxims, it is understood that the nitrile does not necessarily have to be aromatic, but may be aliphatic without departing from the scope of our invention.

The aldehyde derivative is formed by the general reaction:

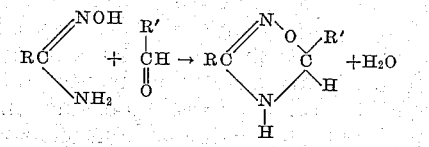

As an example of this general reaction, we give ethylidine para-tolylamidoxim.

Example: Ethylidine p-tolylamidoxim or ethylidine totyl hydrazoxim

The p-tolylamidoxim, which may be prepared in a fashion analogous to that of the ortho compound (given above), is treated with an excess of acetaldehyde; the mixture is subjected to reflux distillation for an hour, after which time the excess aldehyde is allowed to evaporate. This product is easily purified by a single recrystallization from water; the needle-shaped crystals melt at 125° C. (C. P. melting point 127° C.). The reaction for the formation of this product is probably:

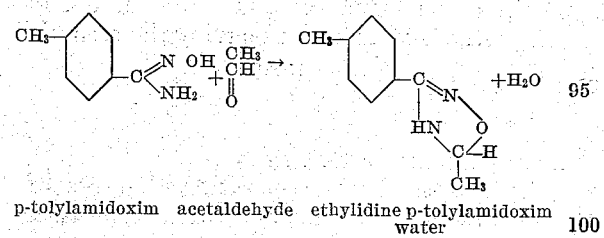

p-tolylamidoxim  acetaldehyde  ethylidine p-tolylamidoxim  water

When these accelerators are incorporated in a mix having the following ratio of ingredients:

- 100 parts rubber
- 5 parts activator (ZnO)
- 6 parts sulfur
- 1 part accelerator cures are obtained in periods varying from 50 to 90 minutes. Many materials are suitable for use as activators. In this case we have used zinc oxide but it is understood that litharge, as well as the acetates, stearates and similar salts of these metals will also serve in such capacity. The following is a list of materials within the scope of our invention, and the time necessary for their optimum cure, along with the elongation at the breaking load.

| | Time at 40# steam | kgs./cm² | Elongation % |
|---|---|---|---|
| Benzylamidoxim | 1:00 | 128 | 820 |
| p-tolylamidoxim | 1:00 | 136 | 860 |
| o-tolylamidoxim | 0:50 | 144 | 830 |
| Ethylidine p-tolylamidoxim | 1:20 | 122 | 825 |
| Ethylidine o-tolylamidoxim | 1:30 | 128 | 815 |

From this it is apparent that many widely different embodiments of our invention may be made without departing from the scope thereof, and it is understood that we do neither limit ourselves to the examples herein set forth nor are we dependent on the soundness of any theory presented by way of explanation, and, although we have described specific accelerators that may be used to promote vulcanization, it is obvious that minor changes may be made without departing from the scope thereof. We desire, therefore, that only such limitations shall be imposed as are consistent with the prior art and the appended claims.

What we claim is:

1. A vulcanized caoutchouc product which contained ortho-tolylamidoxim before vulcanization.

2. A method of treating rubber which comprises vulcanizing it in the presence of a tolylamidoxim.

3. A method of treating rubber which comprises subjecting it to vulcanization in the presence of a material selected from a group comprising benzyl and tolyl amidoxim.

4. A method of accelerating the rate of vulcanization of rubber which comprises heating a vulcanizable compound thereof in the presence of a material having the formula

in which R is a benzene group.

5. A method of accelerating the rate of vulcanization of rubber which comprises heating a vulcanizable compound thereof in the presence of a material having the formula

in which R is a methyl substituted benzene group.

6. A rubber compound that has been vulcanized in the presence of a material having the formula $$R\overset{\displaystyle \nearrow NOH}{\underset{\displaystyle \searrow NH_2}{C}}$$

in which R is a benzene group.

7. A rubber compound that has been vulcanized in the presence of a material having the formula

in which R is a methyl substituted benzene group.

In witness whereof, we have hereunto signed our names.

LORIN B. SEBRELL.
DEXTER N. SHAW.